(12) United States Patent
Kayano et al.

(10) Patent No.: US 11,494,998 B2
(45) Date of Patent: Nov. 8, 2022

(54) VEHICLE COMPONENT DISPLAY DEVICE AND VEHICLE COMPONENT DISPLAY METHOD

(71) Applicant: Toyota Jidosha Kabushiki Kaisha, Toyota (JP)

(72) Inventors: Koichi Kayano, Gifu (JP); Hiroshi Sakai, Toki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/313,397

(22) Filed: May 6, 2021

(65) Prior Publication Data

US 2021/0358221 A1 Nov. 18, 2021

(30) Foreign Application Priority Data

May 18, 2020 (JP) .............................. JP2020-086959

(51) Int. Cl.
*G06T 19/00* (2011.01)
(52) U.S. Cl.
CPC .................. *G06T 19/006* (2013.01)
(58) Field of Classification Search
CPC ............... G06T 19/006; G06F 3/04815; G06F 3/04845; G06F 3/0304
See application file for complete search history.

(56) References Cited

U.S. PATENT DOCUMENTS

2019/0114387 A1* 4/2019 Wolfe ..................... G06F 30/15
2019/0251747 A1* 8/2019 Yin ......................... G06V 20/20

FOREIGN PATENT DOCUMENTS

JP 2016-200855 A 12/2016
JP 2017-049763 A 3/2017

OTHER PUBLICATIONS

Rice et al., Extraction, Rendering and Augmented Interaction in the Wire Assembly of Commercial Aircraft, 2016 IEEE International Conference on Internet of Things (iThings) and IEEE Green Computing and Communications (GreenCom) and IEEE Cyber, Physical and Social Computing (CPSCom), 2016, pp. 349-354. (Year: 2016).*
Elisa Maria Klose, Nils Adrian Mack, Jens Hegenberg, and Ludger Schmidt, Text Presentation for Augmented Reality Applications in Dual-Task Situations, Mar. 2019, In 2019 IEEE Conference on Virtual Reality and 3D User Interfaces (VR), pp. 636-644. (Year: 2019).*

* cited by examiner

*Primary Examiner* — Jeffery A Brier
(74) *Attorney, Agent, or Firm* — Dinsmore & Shohl LLP

(57) ABSTRACT

A vehicle component display device including: a memory; and a processor coupled to the memory, the processor being configured to: acquire a predetermined reference shape from a captured image of a vehicle that is captured by an imaging section; read three-dimensional data of component images corresponding to the reference shape, and display the component images at a display in a state in which the component images are superimposed on the vehicle, the display being visible to a user; display a component configuration diagram at the display together with the component images; and in a case in which a component is selected in the component configuration diagram, emphasize display of the component in the component images displayed at the display.

6 Claims, 7 Drawing Sheets

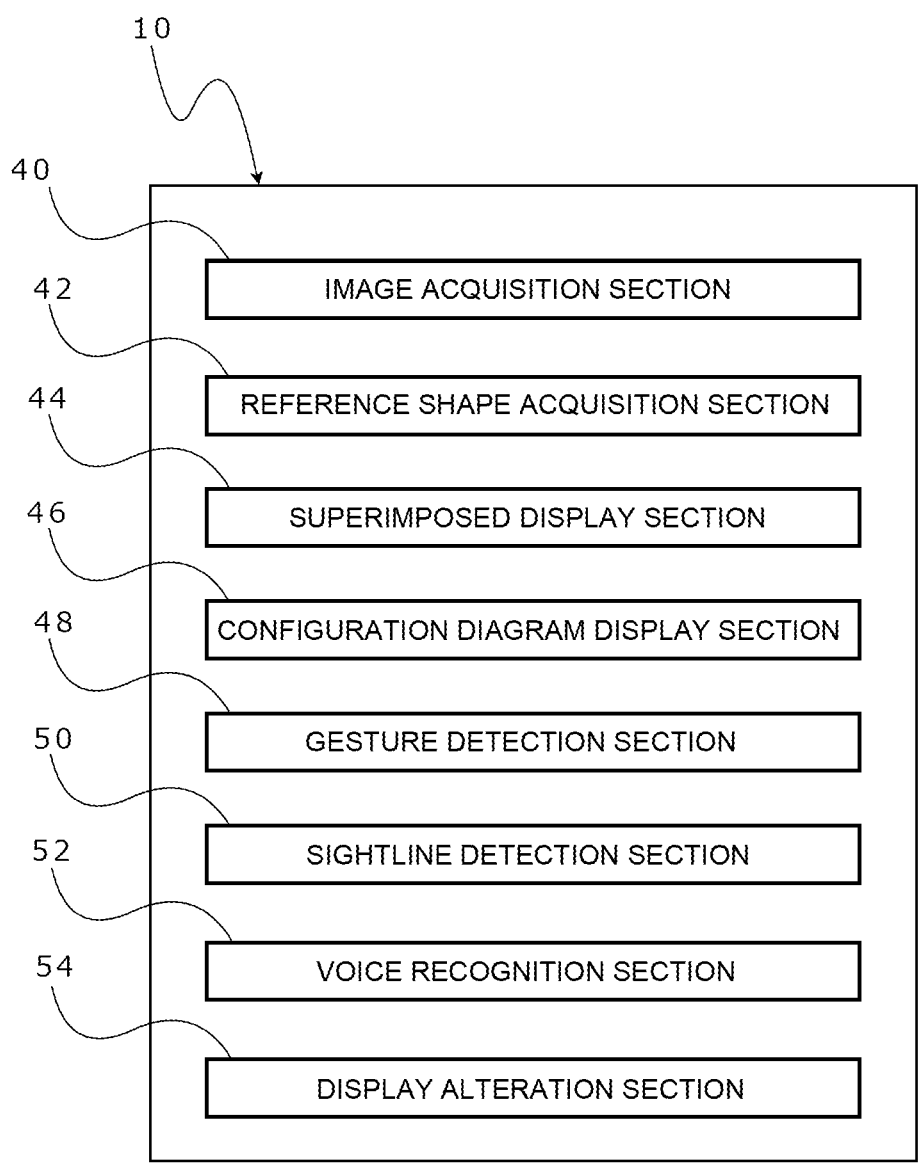

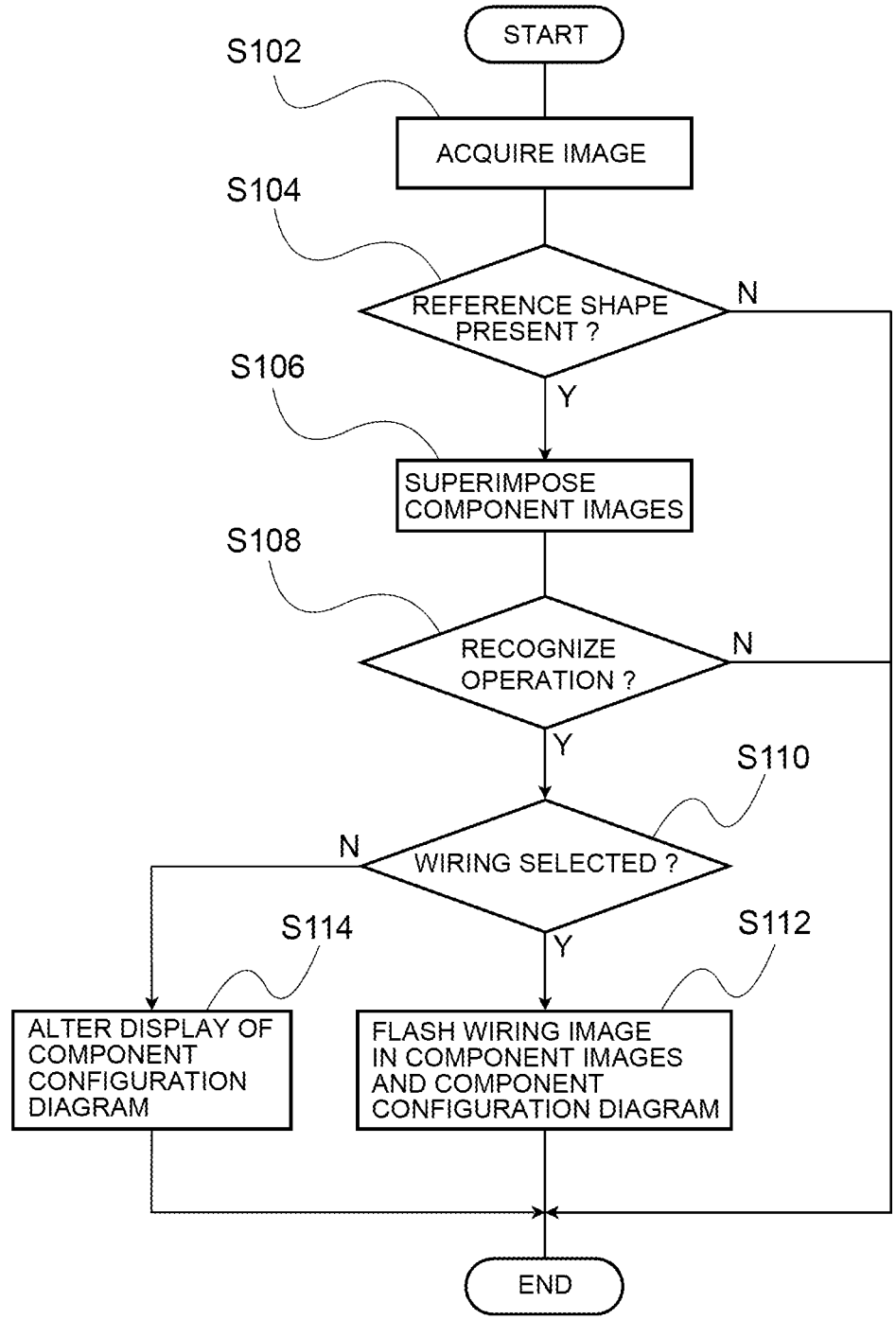

VEHICLE COMPONENT DISPLAY DEVICE AND VEHICLE COMPONENT DISPLAY METHOD

CROSS-REFERENCE TO RELATED APPLICATION

This application is based on and claims priority under 35 USC 119 from Japanese Patent Application No. 2020-086959 filed on May 18, 2020, the disclosure of which is incorporated by reference herein.

BACKGROUND

Technical Field

The present disclosure relates to a vehicle component display device and a vehicle component display method.

Related Art

Japanese Patent Application Laid-Open (JP-A) No. 2017-049763 discloses a glasses-form wearable terminal, which is equipped with means for detecting a position of the terminal. Depending on the position of the terminal, the terminal is configured to show an operations manual to an operator by displaying the operations manual at a screen. Meanwhile, JP-A No. 2016-200855 discloses an equipment inspection system that displays a real-time image and a semitransparent still image superimposed on a monitor. When the monitor is operated in a state in which the real-time image and the semitransparent still image coincide, a manual is displayed at the monitor instead of the semitransparent still image.

However, a vehicle such as a car or the like has a large number of components. Therefore, when the technology recited in the above-mentioned JP-A No. 2017-049763 or 2016-200855 is employed while inspection, maintenance or the like is being carried out, there are a large number of manuals to be displayed. As a result, checking locations and the like of components takes time. Thus, there is scope for improvement in regard to improving operational efficiency.

SUMMARY

The present disclosure provides a vehicle component display device and vehicle component display method that may improve operational efficiency of an inspection, maintenance or the like of a vehicle.

A first aspect of the present disclosure is a vehicle component display device including: a reference shape acquisition section that acquires a predetermined reference shape from a captured image of a vehicle that is captured by an imaging section; a superimposed display section that reads three-dimensional data of component images corresponding to the reference shape, and displays the component images at a display in a state in which the component images are superimposed on the vehicle, the display being visible to a user; a configuration diagram display section that displays a component configuration diagram at the display together with the component images; and a display alteration section that, in a case in which a component is selected in the component configuration diagram, emphasizes display of the component in the component images displayed at the display.

In the vehicle component display device according to the first aspect of the present disclosure, the reference shape acquisition section acquires the predetermined reference shape from a captured image of the vehicle captured by the imaging section. The superimposed display section reads the three-dimensional data of the component images corresponding to the reference shape, and displays the component images at the display being visible to user. The superimposed display section displays the component images in a state in which the component images are superimposed on the vehicle. Therefore, the user may easily identify locations of the components through the superimposed component images.

The component configuration diagram is displayed at the display separately from the component images by the configuration diagram display section. In a case in which a component is selected from the component configuration diagram, the display alteration section emphasizes the display of that component in the component images displayed at the display. Thus, simply by a user selecting an arbitrary component from the component configuration diagram displayed at the display, the corresponding component image may be emphasized. Consequently, locations and structures of arbitrary components may be understood without removing any components and without looking at a manual. The term "component configuration diagram" as used herein is intended to have a broad meaning encompassing system diagrams, connector face views and so forth.

In a second aspect of the present disclosure, in the first aspect, the component images include wiring images of wiring connecting electric components, which structure the vehicle to one another and, in a case in which wiring is selected in the component configuration diagram, the display alteration section emphasizes display of the wiring image that corresponds to selected wiring.

In the vehicle component display device according to the second aspect of the present disclosure, the display alteration section emphasizes display of the wiring image in the display that corresponds to the wiring selected from the component configuration diagram. Wiring in a vehicle can be hidden by other components and be difficult to see, and a user must carry out operations while looking at a wiring diagram in a manual. In the present disclosure, by contrast, wiring images are superimposed, with arbitrary wiring being emphasized in the display. Thus, a user may easily identify locations, connections and the like of wires without having to look at a manual.

In a third aspect of the present disclosure, in the first aspect or the second aspect, the display is provided at a terminal that is wearable by the user, and the configuration diagram display section displays the component configuration diagram to conform with positions and orientations of the terminal.

In the vehicle component display device according to the third aspect of the present disclosure, the component images and component configuration diagram are displayed at a display of a terminal that a user can wear. The component configuration display section displays the component configuration diagram to conform with positions and orientations of the terminal. Therefore, compared to a situation in which a component configuration diagram is displayed fixed in space, cases of a user losing sight of the component configuration diagram may be suppressed. Moreover, the component configuration diagram may be continuously displayed in the user's field of view regardless of postures of the user.

In a fourth aspect of the present disclosure, in any one of the first to third aspects, the superimposed display section displays the component images at an inclination in accordance with an inclination of the vehicle.

In the vehicle component display device according to the fourth aspect of the present disclosure, because the component images are displayed at an inclination in accordance with an inclination of the vehicle, misalignments of location and orientation between the component images and the vehicle may be suppressed.

In a fifth aspect of the present disclosure, in any one of the first to fourth aspects, the component images include components structuring a side door and a back door, and the superimposed display section displays the component images to conform with open and closed states of the side door and the back door.

In the vehicle component display device according to the fifth aspect of the present disclosure, even when a user is conducting an inspection in a state in which the side door and the back door are open, the user may easily identify the locations of components through the component images.

A sixth aspect of the present disclosure is a vehicle component display method including: a reference shape acquisition step of acquiring a predetermined reference shape from a captured image of a vehicle that is captured by an imaging section; a superimposed display step of reading three-dimensional data of component images corresponding to the reference shape, and displaying the component images at a display in a state in which the component images are superimposed on the vehicle, the display being visible to a user; a configuration diagram display step of displaying a component configuration diagram at the display together with the component images; and a display alteration step of, in a case in which a component is selected in the component configuration diagram, emphasizing display of the component in the component images displayed at the display.

As described above, according to the vehicle component display device and vehicle component display method of the present disclosure, operational efficiency of an inspection, maintenance or the like of a vehicle may be improved.

BRIEF DESCRIPTION OF THE DRAWINGS

An exemplary embodiment of the present disclosure will be described in detail based on the following figures, wherein:

FIG. 6 is a block diagram illustrating functional structures of the vehicle component display device according to the exemplary embodiment; and FIG. 7 is a flowchart illustrating an example of a flow of component display processing of the vehicle component display device according to the exemplary embodiment.

DETAILED DESCRIPTION

A vehicle component display device 10 according to an exemplary embodiment is described with reference to the drawings.

Figure 1:
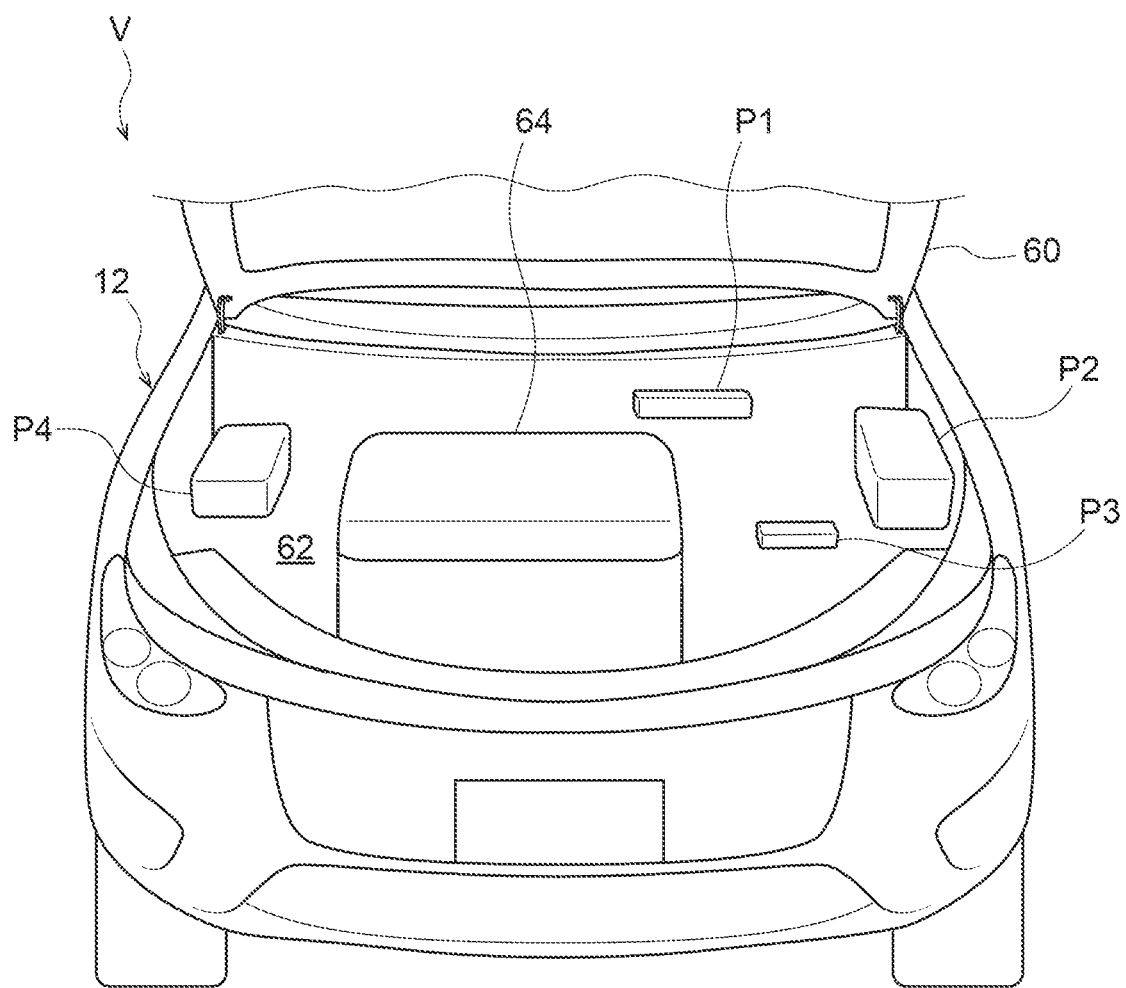
FIG. 1 is a schematic elevation view of a vehicle in a state before component images are displayed at a vehicle component display device according to the exemplary embodiment.

FIG. 1 illustrates a schematic elevation view in which a vehicle V, vehicle components of which are to be displayed by the vehicle component display device 10, is viewed from the front thereof. The vehicle V is provided with a vehicle main body 12.

FIG. 1 illustrates a state in which a hood 60 of the vehicle main body 12 is open and a power unit compartment 62 can be viewed from outside the vehicle V. For ease of description, internal parts of the power unit compartment 62 are not depicted in the drawing.

In addition to a power unit 64 that serves as a drive source for the vehicle V, an electric component P1, an electric component P2, an electric component P3 and an electric component P4 are provided in the power unit compartment 62. These electric components are connected by wiring, which is not illustrated in the drawing.

Figure 2:
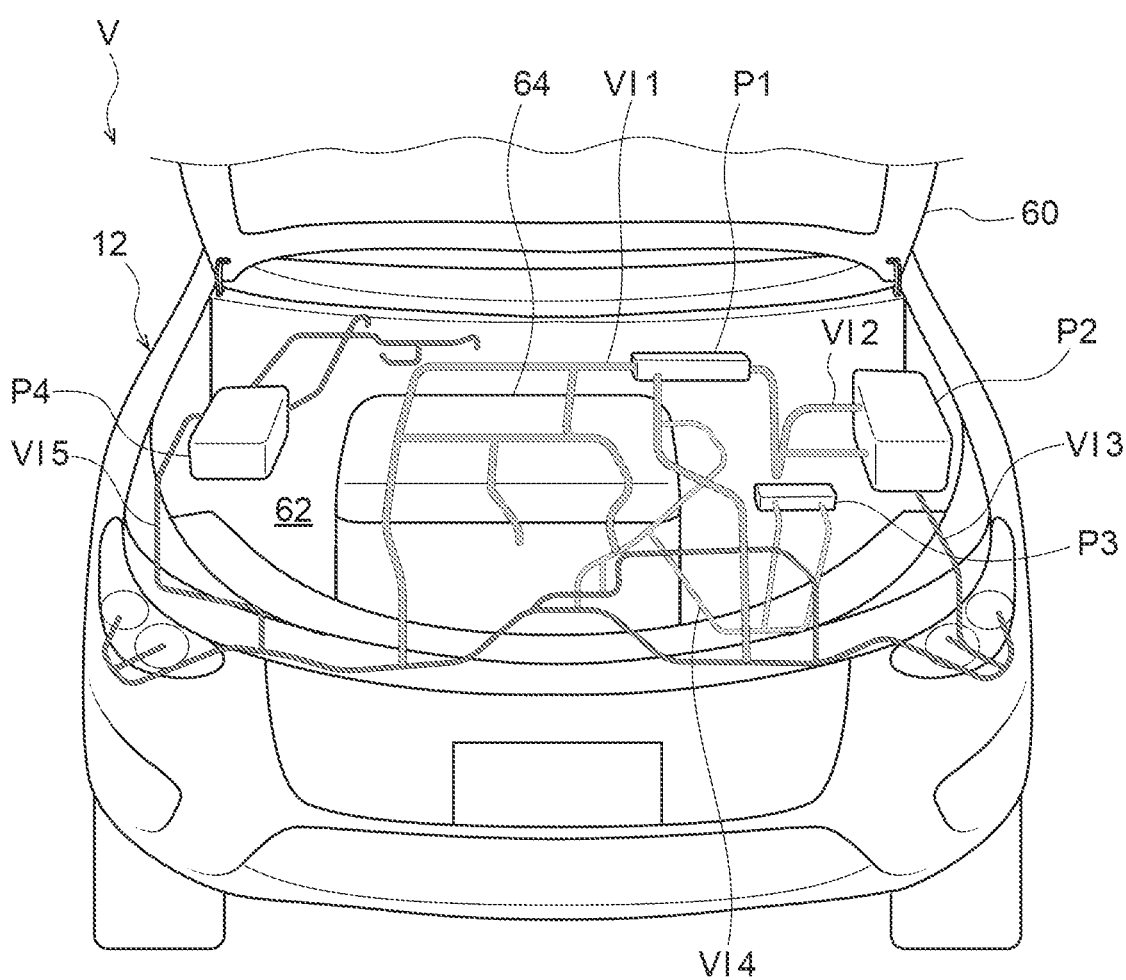
FIG. 2 is a schematic elevation view of the vehicle in a state in which the component images are superimposed by the vehicle component display device according to the exemplary embodiment.

FIG. 2 illustrates a state in which component images are superimposed on the vehicle V by the vehicle component display device 10. In the present exemplary embodiment, as an example of component images, images of the electric component P1, electric component P2, electric component P3 and electric component P4 and wiring images of wire harnesses and the like that connect the electric components are displayed. In the descriptions below, the term "component images" is intended to encompass images including images of electric components and wiring images.

The wiring images are displayed as holograms and include a wiring image VI1, a wiring image VI2, a wiring image VI3, a wiring image VI4 and a wiring image VI5. One end portion of the wiring of wiring image VI1 is connected to the electric component P1. The wiring image VI1 extends to the right side in the image from the electric component P1. The wiring of wiring image VI2 connects the electric component P1 with the electric component P2. The wiring of wiring image VI3 connects the electric component P2 with a left side headlamp. One end portion of the wiring of wiring image VI4 is connected to the electric component P3. The wiring of wiring image VI5 extends from the electric component P4 to a right side headlamp.

The component images are displayed at a display of smart glasses, which are not illustrated in the drawings, that serve as a terminal that can be worn on the head of a user. That is, the smart glasses are structured such that, when a user looks at the vehicle V while wearing the smart glasses, the user can see the component images superimposed on the vehicle V through the display. The wiring image VI1, wiring image VI2, wiring image VI3, wiring image VI4 and wiring image VI5 are displayed in respectively different colors so as to be easily distinguished. These component images are displayed when a predetermined reference shape is recognized in an image of the vehicle V.

Hardware Structures of the Vehicle Component Display Device 10

Figure 5:
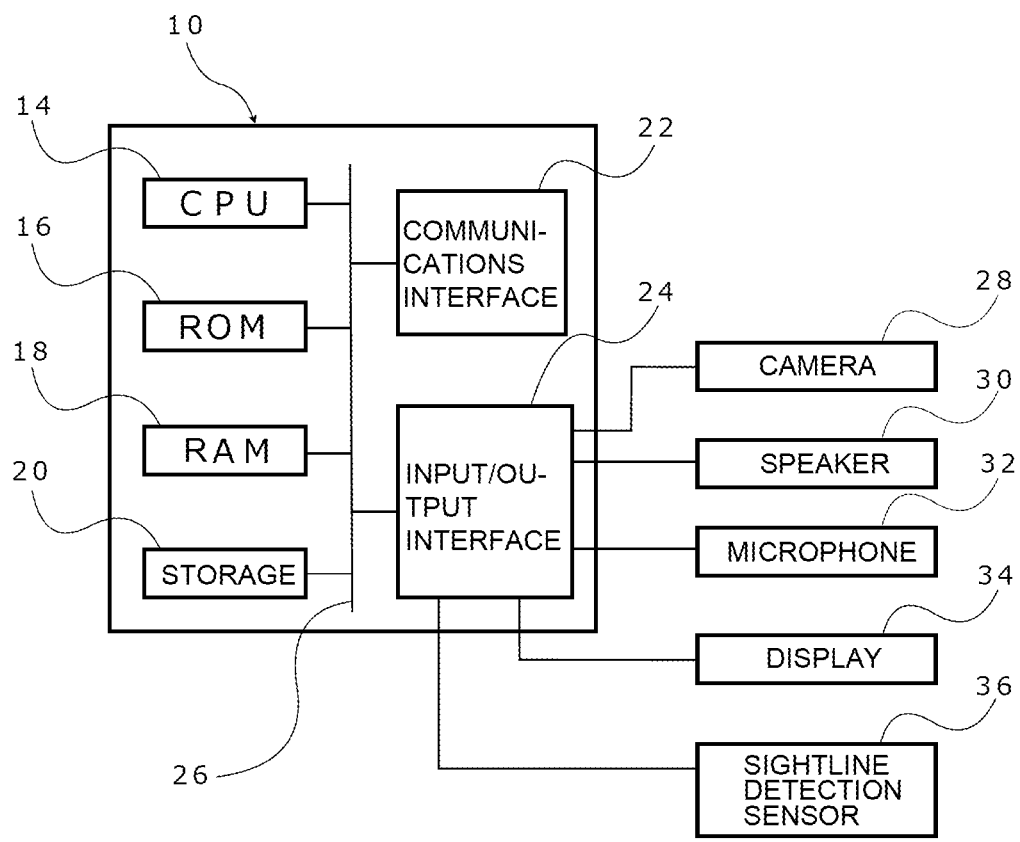
FIG. 5 is a block diagram illustrating hardware structures of the vehicle component display device according to the exemplary embodiment.

FIG. 5 illustrates a block diagram of hardware structures of the vehicle component display device 10. As illustrated in FIG. 5, the vehicle component display device 10 includes a central processing unit (CPU) 14, read-only memory (ROM) 16, random access memory (RAM) 18, storage 20, a communications interface 22 and an input/output interface 24. These structures are connected to be capable of communicating with one another via a bus 26. The CPU 14 is an example of a processor, and the RAM 18 is an example of memory.

The CPU 14 is a central arithmetic processing unit that executes various programs and controls respective parts. That is, the CPU 14 reads a program from the ROM 16 or the storage 20, and executes the program using the RAM 18 as a workspace. The CPU 14 performs control of the structures described above and various kinds of computational processing and the like in accordance with programs recorded in the ROM 16 or the storage 20.

The ROM 16 stores various programs and various kinds of data. The RAM 18 serves as a workspace, temporarily memorizing programs and data. The storage 20 includes a hard disk drive (HDD) or solid state drive (SSD). The storage 20 stores various programs, including an operating system, and various kinds of data. In the present exemplary embodiment, the ROM 16 stores component images and the like for component display processing.

The communications interface 22 is an interface for the vehicle component display device 10 to communicate with external servers and the like through computer networks. The communications interface 22 uses standards such as, for example, 5G, LTE, Wi-Fi (registered trademark), Ethernet (registered trademark) and the like.

The input/output interface 24 is connected with a camera 28 that serves as an imaging section, a speaker 30, a microphone 32, a display 34 and a sightline detection sensor 36, which are incorporated in the smart glasses. A terminal capable of implementing mixed reality (MR) is employed as the smart glasses.

The camera 28 is an optical camera that is provided for imaging external to the smart glasses. For head tracking, a plural number of the camera 28 are provided. The speaker 30 is provided for reporting to the user with voice messages and the like. The microphone 32 is provided for picking up voice messages uttered by the user. The microphone 32 may be provided at a location that is close to the mouth of the user in the state in which the user is wearing the smart glasses.

In the state in which the user is wearing the smart glasses, the display 34 is disposed in front of the eye(s) of the user. The display 34 is structured such that the user can see a vehicle V that is to be maintained or inspected through the display 34. As an example in the present exemplary embodiment, the display 34 is formed of a semitransparent material. Therefore, before an image is displayed at the display 34, the user can view a scene through the display 34. However, this is not limiting. For example, the display may be formed of a nontransparent material, in which case the user may view the scene in the user's line of sight by images captured by the camera 28 being displayed at the display 34 in real time.

The sightline detection sensor 36 includes, for example, two infrared cameras. The sightline detection sensor 36 is an eye-tracking sensor that detects directions of the user's line of sight.

Functional Structures of the Vehicle Component Display Device 10

The vehicle component display device 10 uses the hardware resources described above to realize various functions. The functional structures realized by the vehicle component display device 10 are described with reference to FIG. 6.

As illustrated in FIG. 6, as functional structures, the vehicle component display device 10 includes an image acquisition section 40, a reference shape acquisition section 42, a superimposed display section 44, a configuration diagram display section 46, a gesture detection section 48, a voice recognition section 52 and a display alteration section 54. These functional structures are realized by the CPU 14 reading and executing a program memorized in the ROM 16 or the storage 20.

The image acquisition section 40 acquires images captured by the camera 28. More specifically, the image acquisition section 40 acquires an image captured by the camera 28 that is provided at a front portion of the smart glasses. Thus, the image acquired by the image acquisition section 40 is similar to a scene in the direction in which the user is looking.

The reference shape acquisition section 42 acquires a predetermined reference shape in a captured image of the vehicle V that is captured by the camera 28. More specifically, the external shape of a region of the vehicle V at which component images are to be displayed serves as a reference shape. When the reference shape is present in a captured image, the reference shape acquisition section 42 acquires the reference shape. For example, the external shape of a front view of the vehicle V is specified as a reference shape corresponding with component images of the power unit compartment 62 illustrated in FIG. 1. Further, the external shape of a side door of the vehicle V, which is not illustrated in the drawings, is specified as a reference shape corresponding with component images of the side door, and the external shape of a back door of the vehicle V, which is not illustrated in the drawings, is specified as a reference shape corresponding with component images of the back door.

The superimposed display section 44 illustrated in FIG. 6 reads three-dimensional data of component images corresponding with the reference shape, and causes the component images to be displayed at the display 34 of the smart glasses in a state in which the component images are superimposed on the vehicle V. In the present exemplary embodiment, the three-dimensional data of the component images is stored in the storage 20, and the superimposed display section 44 reads the three-dimensional data of the component images from the storage 20. Images of the electric component P1, electric component P2, electric component P3 and electric component P4 and of wire harnesses and the like connecting these electric components are displayed superimposed on the vehicle V. Hence, when the vehicle V is seen through the display 34 of the smart glasses, the images illustrated in FIG. 2 can be seen. The superimposed display section 44 according to the present exemplary embodiment causes the component images to be displayed at an inclination according to an inclination of the vehicle V. For example, when a platform supporting the vehicle V is tilted, the component images are displayed at an inclination to match this tilted state.

Moreover, the superimposed display section 44 is configured to cause the component images to be displayed to conform with open and closed states of the side door and back door. That is, in a region in which a side door, back door or the like may be opened or closed, the component images are displayed to match open and closed positions.

Figure 3:
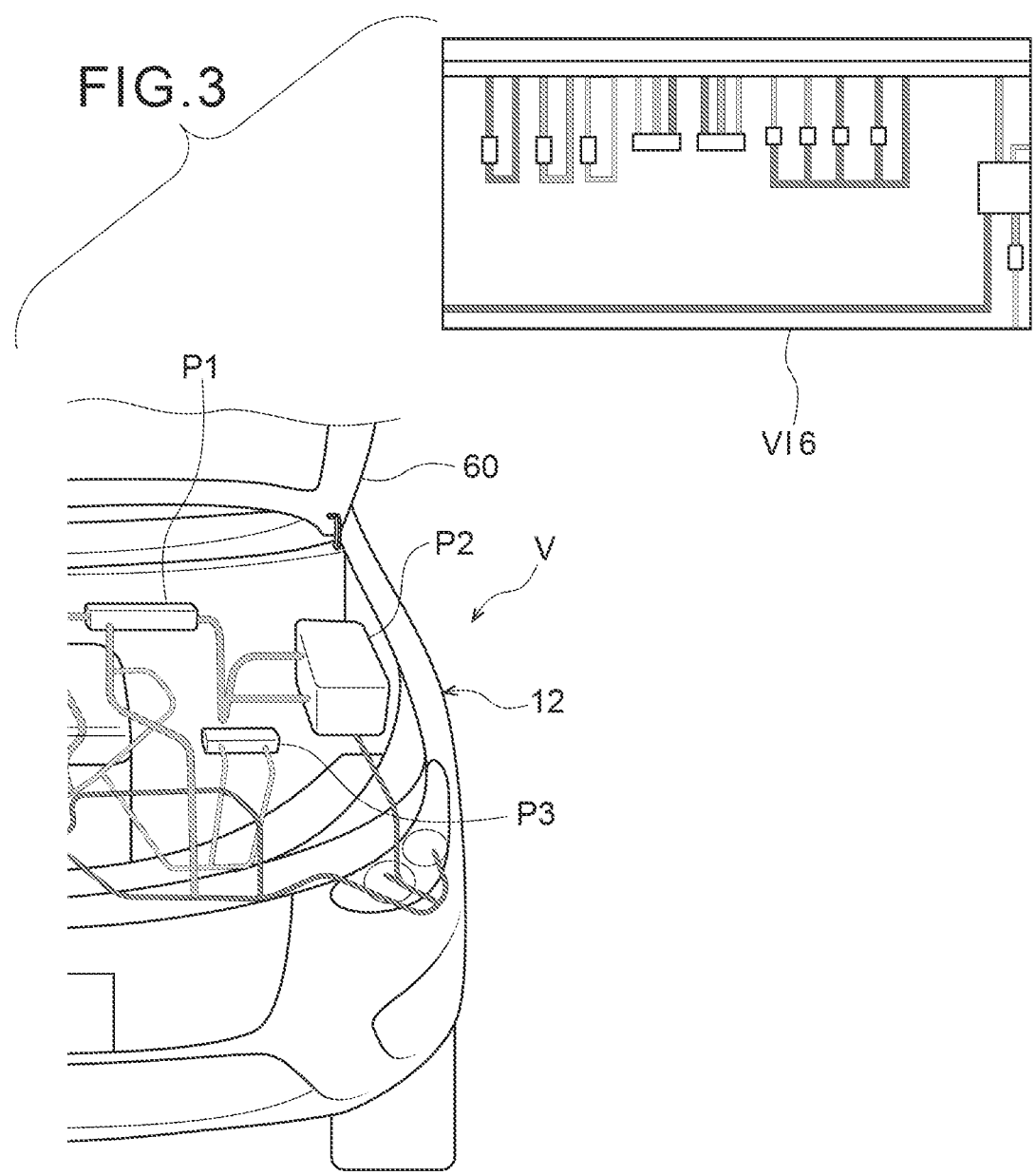
FIG. 3 is a schematic elevation view of the vehicle in a state in which, in addition to the state in FIG. 2, a component configuration diagram is displayed.

The configuration diagram display section 46 causes the component configuration diagram to be displayed at the display 34 with the component images. FIG. 3 illustrates images that are displayed when the vehicle V is viewed through the display 34 of the smart glasses. In FIG. 3, a system diagram VI6 that serves as the component configuration diagram is displayed separately from the component images. The system diagram VI6 is displayed fixed in space, and may be moved or deleted by user operations. The configuration diagram display section 46 is configured to be capable of displaying plural system diagrams VI6 and plural connector face views at the display 34.

The configuration diagram display section 46 according to the present exemplary embodiment is configured to display the component configuration diagram to conform with positions and orientations of the smart glasses. Accordingly, the relative positions of the smart glasses and the system diagram VI6 do not change when the user moves.

The gesture detection section 48 illustrated in FIG. 6 detects hand gestures of the user. More specifically, the gesture detection section 48 recognizes a hand of the user that is captured by the camera 28 and, when a movement of the hand is a predetermined action, the gesture detection section 48 produces an output corresponding to the action. For example, when the hand of the user touches at a selectable item in the component configuration diagram, the gesture detection section 48 detects the hand of the user and the selection is implemented.

A sightline detection section 50 that is illustrated in FIG. 6 detects the line of sight of the user. More specifically, the sightline detection section 50 detects and outputs predetermined movements of the line of sight of the user that are acquired by the sightline detection sensor 36. For example, the sightline detection section 50 displays the line of sight of the user on the display 34 as a cursor, and when the line of sight coincides with a particular selectable item for a predetermined duration, the sightline detection section 50 detects this and the selection is implemented.

The voice recognition section 52 recognizes details of utterances by the user. More specifically, the voice recognition section 52 recognizes predetermined words in voice messages from the user that are picked up by the microphone 32, and produces outputs corresponding to these words. The gesture detection section 48, the sightline detection section 50 and the voice recognition section 52 are configured to be switched on and off by user operations.

Figure 4:
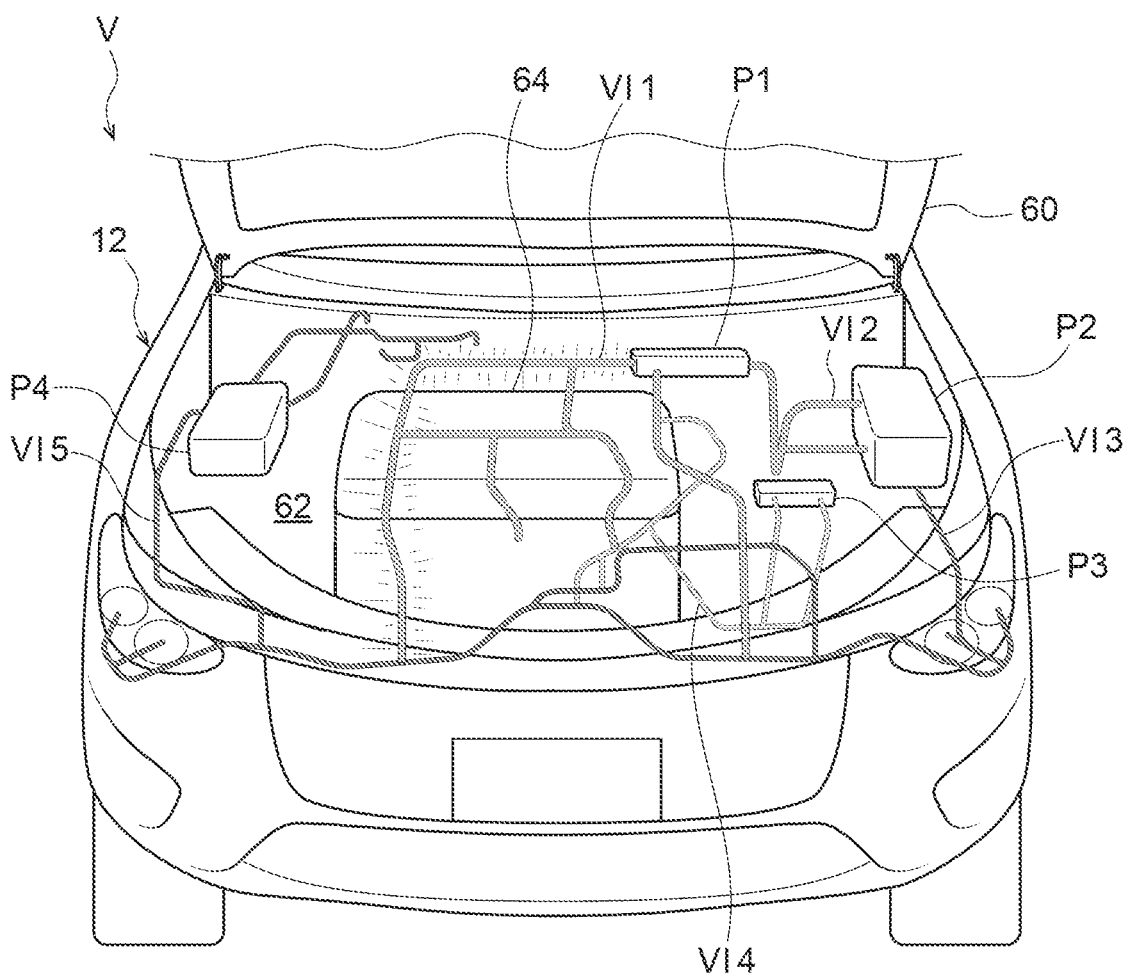
FIG. 4 is a schematic elevation view of the vehicle in a state in which wiring has been selected from the state in FIG. 3.

When a component is selected from the component configuration diagram, the display alteration section 54 emphasizes display of that component in the component images displayed at the display 34. Further, the display alteration section 54 emphasizes display of a wiring image corresponding to wiring selected from the component configuration diagram. In the present exemplary embodiment, when the user selects arbitrary wiring from the system diagram VI6 in the state in FIG. 3, a wiring image corresponding to the selected wiring flashes. For example, when the user selects wiring corresponding to the wiring image VI1 from the system diagram VI6, the display alteration section 54 causes the wiring image VI1 to flash, as illustrated in FIG. 4. At the same time, the display alteration section 54 causes the wiring corresponding to the wiring image VI1 in the system diagram VI6 to flash similarly.

Operation

Now, operation of the present exemplary embodiment is described.

Example of Component Display Processing

FIG. 7 is a flowchart illustrating an example of a flow of component display processing by the vehicle component display device 10. This component display processing is implemented by the CPU 14 reading a program from the ROM 16 or storage 20, loading the program into the RAM 18, and executing the program. This component display processing is executed while a program that implements display of the component images while a user is wearing the smart glasses is being executed.

In step S102, the CPU 14 acquires an image. More specifically, by the functioning of the image acquisition section 40, the CPU 14 acquires an image captured by the camera 28 provided at the front portion of the smart glasses. Therefore, the image acquired in step S102 is similar to a scene in the direction in which the user is looking.

In step S104, the CPU 14 makes a determination as to whether a reference shape is present (a reference shape acquisition step). More specifically, by the functioning of the reference shape acquisition section 42, when a reference shape is included in an acquired image of the vehicle V, the CPU 14 determines that the reference shape is present and advances to the processing of step S106. On the other hand, when no reference shape is included in the acquired image of the vehicle V, the CPU 14 determines that no reference shape is present and ends the component display processing.

In step S106, the CPU 14 superimposes the display of component images (a superimposed display step). More specifically, by the functioning of the superimposed display section 44, the CPU 14 superimposes the electric component P1, electric component P2, electric component P3, electric component P4, wiring image VI1. wiring image VI2, wiring image VI3, wiring image VI4 and wiring image VI5 on the vehicle V (see FIG. 2).

In step S108, the CPU 14 makes a determination as to whether the user has performed an operation. By the functioning of the configuration diagram display section 46, the system diagram VI6, which is a component configuration diagram, is displayed at the display 34 of the smart glasses (a configuration diagram display step).

When an operation is performed by the user by any of various methods according to the functioning of the gesture detection section 48, the sightline detection section 50 and the voice recognition section 52, in step S108 the CPU 14 determines that an operation is recognized and advances to the processing of step S110. On the other hand, when no operation is detected by the gesture detection section 48, the sightline detection section 50 and the voice recognition section 52, in step S108 the CPU 14 determines that no operation is recognized and ends the component display processing.

In step S110, the CPU 14 makes a determination as to whether wiring has been selected. More specifically, when the CPU 14 determines that the operation recognized in step S108 is an operation to select wiring in the system diagram VI6, the CPU 14 advances to the processing of step S112. On the other hand, if the CPU 14 determines that the operation recognized in step S108 is an operation other than an operation to select wiring in the system diagram VI6, the CPU 14 advances to the processing of step S114.

In step S112, the CPU 14 causes wiring images in the component images and the component configuration diagram to flash (a display alteration step). More specifically, of wiring images superimposed on the vehicle V, the CPU 14 causes a wiring image selected by the user to flash (see FIG. 4). The CPU 14 also causes a wiring image in the system diagram VI6 to flash similarly. Then the CPU 14 ends the component display processing.

Alternatively, in step S114, the CPU 14 alters the display of the component configuration diagram. That is, the CPU 14 changes the display of the system diagram VI6 in accordance with the user operation recognized in step S108. For example, when the operation recognized in step S108 is an operation to move the system diagram VI6, in step S114 the CPU 14 moves the system diagram VI6. Then the CPU 14 ends the component display processing.

In the vehicle component display device 10 according to the present exemplary embodiment as described above, component images (the electric component P1, electric component P2, electric component P3, electric component P4, wiring image VI1, wiring image VI2, wiring image VI3, wiring image VI4 and wiring image VI5) are displayed superimposed by the superimposed display section 44 in a state in which the component images are superimposed on the vehicle V. Therefore, a user may easily identify locations of the components through the superimposed component images.

The system diagram VI6 is displayed at the display 34 separately from the component images by the configuration diagram display section 46. When a component is selected in the system diagram VI6, the display alteration section 54 causes a wiring image displayed at the display 34 to flash. Therefore, by the user simply selecting arbitrary wiring in the system diagram VI6 displayed at the display 34, the corresponding wiring image is flashed and the user may understand the location and structure of the wiring without removing any components. Thus, according to the vehicle component display device 10 according to the present disclosure, operational efficiency of an inspection, maintenance or the like of a vehicle V may be improved.

In particular, wiring in a vehicle V can be hidden by other components and be difficult to see, and a user must carry out operations while looking at a wiring diagram in a manual. By contrast, when an arbitrary wiring image is emphasized in the display 34, a user may easily identify locations, connections and the like of wires without having to look at a manual.

In the present exemplary embodiment, the component images and the system diagram VI6 are displayed at the display 34 of the smart glasses that are wearable by the user. The system diagram VI6 is displayed to conform with positions and orientations of the smart glasses. Therefore, compared to a situation in which the system diagram VI6 is displayed fixed in space, cases of a user losing sight of the system diagram VI6 may be suppressed. Moreover, the system diagram VI6 may be continuously displayed in the user's field of view regardless of postures of the user.

In the present exemplary embodiment, because the component images are displayed at an inclination in accordance with an inclination of the vehicle, misalignments of location and orientation between the vehicle V and the component images may be suppressed. Further, when a user is checking wiring at a side door, a back door or the like, even when the user is conducting an inspection in a state in which the side door or back door is open, the user may easily identify locations of wiring through wiring images.

Hereabove, an exemplary embodiment is described, but it will be clear that numerous embodiments are possible within a scope not departing from the gist of the present disclosure. For example, in the above exemplary embodiment, the hardware structures of the vehicle component display device 10 are provided at the smart glasses, but this is not limiting. Some or all of the hardware structures may be provided at an external server, in which case component images, system diagrams and the like may be acquired and displayed through a communications section provided at the smart glasses. Furthermore, images captured by a camera provided at the smart glasses may be sent to an external server, and image processing and the like may be performed in a cloud.

In the above exemplary embodiment, smart glasses are employed as a terminal that displays component images and component configuration diagrams, but this is not limiting. For example, component images and component configuration diagrams may be displayed at a display of a tablet, a smartphone or the like. However, with regard to performing operations while checking component images and component configuration diagrams, component images and component configuration diagrams may be displayed at a display of a wearable terminal such as smart glasses or the like.

In the above exemplary embodiment, when a selected component image is to be emphasized, the component image is flashed, but this is not limiting; an alternative emphasized display may be employed. For example, a selected component image alone may be displayed in color and other component images displayed in monochrome. Alternatively, a selected component image alone may be emphasized by raising the brightness and color saturation thereof.

The component display processing that, in the exemplary embodiment described above, is executed by the CPU 14 reading software (a program) may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The component display processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

What is claimed is:

1. A vehicle component display device, comprising:
   a memory; and
   a processor coupled to the memory, the processor being configured to:
   acquire a predetermined reference shape from a captured image of a vehicle that is captured by an imaging section;
   read three-dimensional data of component images corresponding to the reference shape, and display the component images at a display in a state in which the component images are superimposed on the vehicle, the display being visible to a user, the display is provided at a terminal that is wearable by the user;
   display a component configuration diagram at the display together with the component images;
   display the component configuration diagram to conform with positions and orientations of the terminal;
   continuously display the component configuration diagram in the user's field of view regardless of postures of the user; and
   in a case in which a component is selected in the component configuration diagram, emphasize display of the component in the component images displayed at the display.

2. The vehicle component display device according to claim 1, wherein:
   the component images include wiring images of wiring connecting electric components, which structure the vehicle, to one another, and the processor is configured to, in a case in which wiring is selected in the component configuration diagram, emphasize display of the wiring image that corresponds to selected wiring.

3. The vehicle component display device according to claim 1, wherein the processor is configured to display the component images at an inclination in accordance with an inclination of the vehicle.

4. The vehicle component display device according to claim 1, wherein:
the component images include components structuring a side door and a back door, and
the processor is configured to display the component images to conform with open and closed states of the side door and the back door.

5. A vehicle component display device according to claim 1, further comprising a sightline detection sensor that detects directions of a user's line of sight, wherein when the user's line of sight detected by the sightline detection sensor coincides with the component for a predetermined duration, the processor emphasizes the display of the component in the component images displayed at the display.

6. A vehicle component display method in which a processor executes processing comprising:
providing a display at a terminal that is wearable by a user, the display being visible to the user;
acquiring a predetermined reference shape from a captured image of a vehicle that is captured by an imaging section;
reading three-dimensional data of component images corresponding to the reference shape, and displaying the component images at the display in a state in which the component images are superimposed on the vehicle;
displaying a component configuration diagram at the display together with the component images;
displaying the component configuration diagram to conform with positions and orientations of the terminal;
continuously displaying the component configuration diagram in the user's field of view regardless of postures of the user; and
in a case in which a component is selected in the component configuration diagram, emphasizing display of the component in the component images displayed at the display.

* * * * *